May 13, 1941. J. S. JUDELL ET AL Re. 21,799

SPRAY HEAD

Original Filed Sept. 19, 1938

INVENTORS.
J. S. Judell
BY M. W. Held
Morsell, Lieber & Morsell
ATTORNEYS.

Reissued May 13, 1941

Re. 21,799

UNITED STATES PATENT OFFICE 21,799

SPRAY HEAD

Julius S. Judell, Shorewood, and Milbert W. Held, Whitefish Bay, Wis., assignors to Milwaukee Flush Valve Company, Milwaukee, Wis., a corporation of Wisconsin Original No. 2,200,503, dated May 14, 1940, Serial No. 230,596, September 19, 1938. Application for reissue December 16, 1940, Serial No. 371,160

10 Claims. (Cl. 4—187)

The present invention relates generally to improvements in the art of dispensing liquids, and relates more particularly to improvements in the construction of spray heads.

Generally defined, an object of our present invention is the provision of an improved plumbing fixture which is simple in construction, neat and attractive in appearance, and highly efficient and practical in use.

As shown in Patent No. 2,173,064, granted September 12, 1939, to Julius S. Judell, it has heretofore been proposed to attach a spray head to the end of a normally concealed hose for use in connection with kitchen sinks or the like. The spray head therein shown, however, is not of the most practical construction since it is highly desirable to provide a spray head of highly attractive appearance and conveniently accessible so as to permit disposition in a retaining socket placed anywhere upon the sink without detracting therefrom and it is furthermore extremely desirable to provide a spray head which can be safely used with either hot or cold water.

It is therefore a more specific object of our invention to provide a spray head of neat and attractive appearance and which is adapted for use in connection with kitchen sink assemblages of the aforementioned type.

A further specific object of our invention is to provide an insulated spray head which provides adequate protection to the user when hot water is passed therethrough.

A still further object of our present invention is to provide a spray head adapted to cooperate with a flexible conduit and with a sink and of such shape and construction as to be readily manipulated.

Still another specific object of the invention is to provide a spray head of durable construction which may be dropped or bumped against hard objects without danger of breaking the nozzle or other objects.

An additional specific object of the present invention is to provide a spray head which may be manufactured at moderate cost and which may be readily installed and operated.

These and other specific objects and advantages will be apparent from the following detailed description.

A clear conception of the several features constituting our present improvement, and of the mode of constructing and of applying spray heads built in accordance with the invention, may be had by referring to the drawing accompanying and forming a part of this specification wherein the reference characters designate the same or similar parts in the various views.

While the invention has been shown and described as being specifically embodied in a special type of sink assemblage, it is not the intent to thereby unnecessarily restrict the scope, since the features are more generally applicable to plumbing fixtures.

Figure 1:
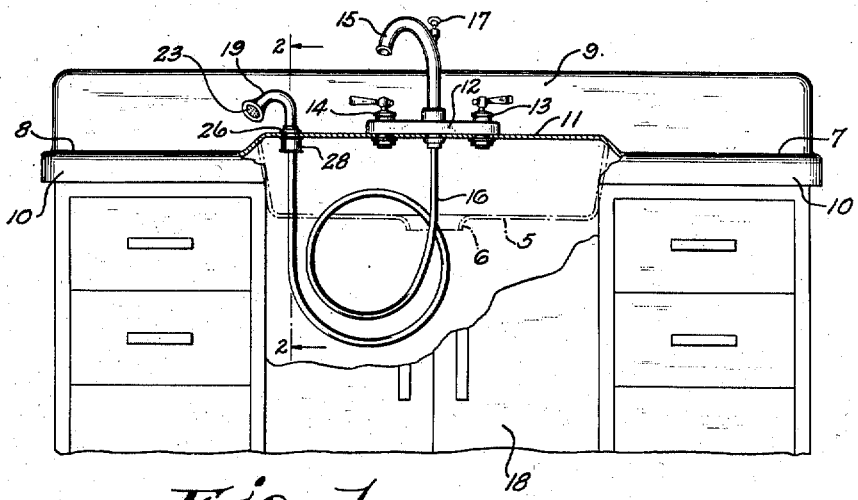
Fig. 1 is a fragmentary part sectional front view of a sink showing the improved spray head in normal position as applied to a kitchen sink assemblage.
Figure 2:
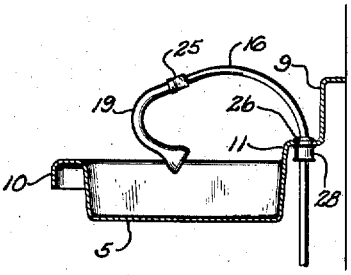
Fig. 2 is a transverse vertical section through the sink taken along the line 2—2 of Fig. 1 and showing the improved spray head in extended position.

Referring to the drawing, the sink assemblage shown in Figs. 1 and 2, comprises in general a sink having a basin 5 provided with a drain 6, drain boards 7, 8 for dishes or other objects formed integral with the opposite ends of the basin, a rear wall 9 formed integral with the basin and drain boards, and an apron 10 also formed integral with the basin and drain boards and extending therearound from one end of the rear wall 9 to the other. The sink also has an integral elevated portion 11 disposed between the basin 5 and the rear wall 9, and attached to the medial part of this elevated portion 11 is a swing spout faucet 12 having hot and cold control valves 13, 14 respectively and an adjustable spout 15 disposed between these valves 13, 14. Communicating with the lower portion of the spout 15 is a flexible hose or conduit 16 through which hot or cold water may be diverted by manipulation of a diverter valve control 17. This flexible hose 16 is confined beneath the sink and is concealed by the sink cabinet 18.

Figure 4:
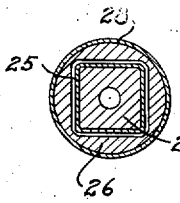
Fig. 4 is a transverse horizontal section through the assemblage taken along the line 4—4 of Fig. 3.
Figure 3:
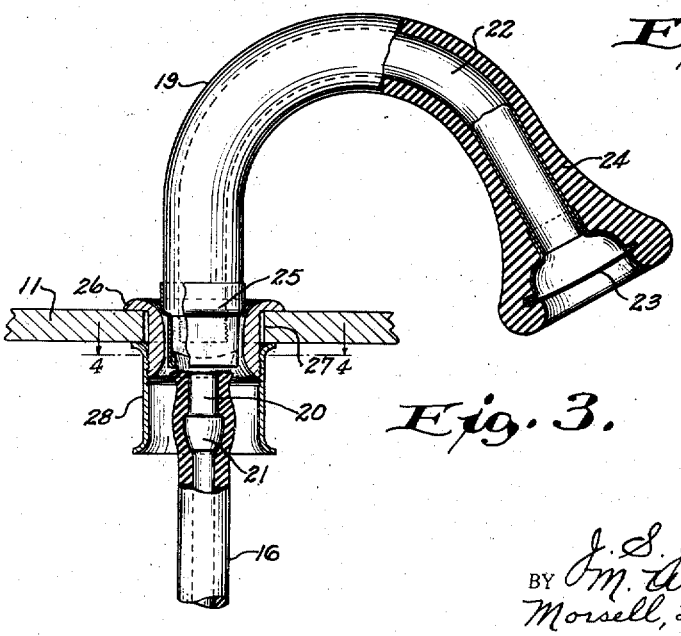
Fig. 3 is an enlarged fragmentary part sectional side elevation of the improved spray head as applied to a portion of the sink.

The present improved spray head 19, shown in detail in Fig. 3, consists of a hose attachment plug or fitting 20 having a hose retaining knob 21, a curved brass tube 22 secured at one end to the fitting 20 and having its opposite end provided with a spray nozzle 23. A rubber covering 24 provides a convenient gripping handle above the nozzle and is either pre-molded and slipped over the tube 22 and around the spray nozzle 23, or it may be molded directly upon these elements, and the end of the covering 24 adjacent to the fitting 20 is embraced and protected against damage by a snug fitting sleeve 25 having a polygonal lower end. A tubular guide nut 26 having a polygonal hole is adapted to coact with the polygonal portion of the sleeve 25 to retain the spray head 19 in any desired normal or inactive position, and is secured within a bore 27 in the elevated portion 11 of the sink by means of a sleeve 28 coacting therewith, see Figs. 3 and 4.

The curved tube 22 may first be formed in the desired shape and size with one end thereof threaded or otherwise adapted to receive the hose fitting 20. The spray nozzle 23 of desired shape and size may then be threaded or otherwise attached to the tube 22 at the end remote from the threading and the rubber covering 24 may thereafter be applied to the tube 22 and nozzle 23. The hose fitting 20 may then be attached to the threaded end of the tube 22 and the sleeve 25 may thereafter be attached thereto around the adjacent end of the covering 24, thus completing the spray head assemblage. A hole 27 may then be bored in any desired and conveniently accessible part of the elevated portion 11 of the sink, but it is preferable to have this bore 27 to the left of the faucet 12 and near the drain board 8 as shown in Fig. 1 because in washing dishes, the dirty dishes are usually placed on the drain board 7, are washed in the basin 5 and are then placed on the drain board 8 for rinsing which may be conveniently done with the spray head and apparatus shown. The nut 26 may then be placed within the bore 27 and the sleeve 28 may be screwed or otherwise attached thereto from the lower side of the sink portion 11, thus firmly securing the nut 26 in position. The flexible hose 16 which communicates with the diverter, may then be pulled through the hole in the nut 26 and may thereafter be forced over the knob 21 of the fitting 20 until it tightly embraces the fitting.

From the foregoing description it will be apparent that the present invention provides a simple spray head which is extremely neat in appearance, durable in construction, and highly efficient in use. The spray head may be formed in any desired shape or size and may be positioned on any desired portion of the sink without detracting therefrom. The rubber or similar covering provides a highly efficient insulating shield serving as a protection to the user against burning, and furthermore as a protection against possible chipping of the sink enamel and of dishes resting upon the sink. The improved spray head is moreover attractive in appearance, and by virtue of the polygonal or square formation of the sleeve 25 and of the hole in the nut 26, the nozzle or head 19 may be set in various fixed positions when not being handled. Obviously, instead of using rubber, other resilient material may be employed, and the covering 24 provides an enlarged conveniently accessible gripping portion above the nozzle and thus facilitates safe manipulation of the nozzle. The diverter valve and control 17 provide simple means for by-passing the flow either to the spout 18 or to the spray head 19 at the will of the operator. The improved spray head has proven highly successful in actual commercial use, and can be conveniently manufactured for sale at moderate cost.

It should be understood that it is not desired to limit the invention to the exact details of construction and to the precise mode of utilization herein shown and described, for various modifications within the scope of the claims may occur to persons skilled in the art.

We claim:

1. A plumbing fixture comprising, a pipe having a hose attachment at one end and a spray nozzle at the opposite end, a rigid protective covering molded about said pipe and nozzle to form a gripping handle thereover, and a sleeve embracing the hose attachment end of the covering.

2. A plumbing fixture comprising, a substantially U-shaped metal tube carrying a spray nozzle at one end thereof, a rigid insulated protective covering concealing the tube and nozzle and forming a protective handle thereover, a hose connected to the opposite end of said tube, and a protective sleeve for said covering embracing said covering at said opposite tube end adjacent said hose.

3. In combination with a sink, a guide nut secured to the sink and having a polygonal hole, and a substantially U-shaped rubber covered nozzle forming a protective gripping handle and having a polygonal protective end sleeve cooperable with said hole.

4. In combination with a sink, a guide nut secured to the sink and having a polygonal hole, and a substantially U-shaped rubber covered nozzle forming a protective gripping handle and having a polygonal protective end sleeve cooperable with said hole, said nozzle sleeve being positionable in said hole in any of several positions.

5. In combination, a sink with a polygonal hole, a U-shaped nozzle having a downwardly directed spray head at one end and a polygonal opposite end, said opposite end being interchangeably insertible in said hole to place said spray head in any of several positions.

6. In combination, a sink having a guide nut provided with a polygonal hole secured thereto, a U-shaped nozzle having a downwardly directed spray head at one end and a downwardly directed polygonal protective end sleeve at the opposite end, said sleeve being interchangeably insertible in said nut to place said spray head in any of several positions.

7. In combination, a sink having a basin and a tubular guide near said basin, a rigid pipe having one end provided with a discharge nozzle and its opposite end provided with a fitting cooperable with said sink guide to retain the pipe in various radial positions relative to the guide axis and with said nozzle directed toward the sink basin, and a flexible hose for delivering liquid under pressure to said pipe and nozzle through said fitting, said fitting and guide being formed and cooperable to prevent relative rotation thereof about said axis when the fitting and guide are coacting with each other and said fitting being freely vertically removable from said guide to withdraw said hose through the guide and to permit universal movement of the pipe and nozzle.

8. In combination, a sink having a basin and a tubular guide near said basin, a rigid pipe having one end provided with a discharge nozzle and its opposite end provided with a fitting cooperable with said sink guide to retain the pipe in various radial positions relative to the guide axis and with said nozzle directed toward the sink basin, a flexible hose for delivering liquid under pressure to said pipe and nozzle through said fitting, said fitting and guide being formed and cooperable to prevent relative rotation thereof about said axis when the fitting and guide are coacting with each other and said fitting being freely vertically removable from said guide to withdraw said hose through the guide and to permit universal movement of the pipe and nozzle, and a protective gripping handle associated with said pipe between said nozzle and said fitting.

9. In combination, a sink having a basin and a tubular guide near said basin, a rigid conduit having opposite end portions extending in the same direction away from an intermediate portion, a liquid discharge nozzle carried by one of said conduit end portions, a supporting fitting carried by the other of said conduit end portions and being removably cooperable with said sink guide in various radial positions relative to the guide axis, a flexible hose for delivering liquid under pressure to said conduit and nozzle through said fitting, and means associated with said guide and fitting for preventing relative rotation thereof about said axis when the fitting is disposed within the guide.

10. In combination, a sink having a basin and a tubular guide near said basin, a rigid conduit having opposite end portions extending in the same direction away from an intermediate portion, a liquid discharge nozzle carried by one of said conduit end portions, a supporting fitting carried by the other of said conduit end portions and being removably cooperable with said sink guide in various radial positions relative to the guide axis, a flexible hose for delivering liquid under pressure to said conduit and nozzle through said fitting, means associated with said guide and fitting for preventing relative rotation thereof about said axis when the fitting is disposed within the guide, and a protective gripping covering for said intermediate conduit portion.

JULIUS S. JUDELL.
MILBERT W. HELD.